UNITED STATES PATENT OFFICE.

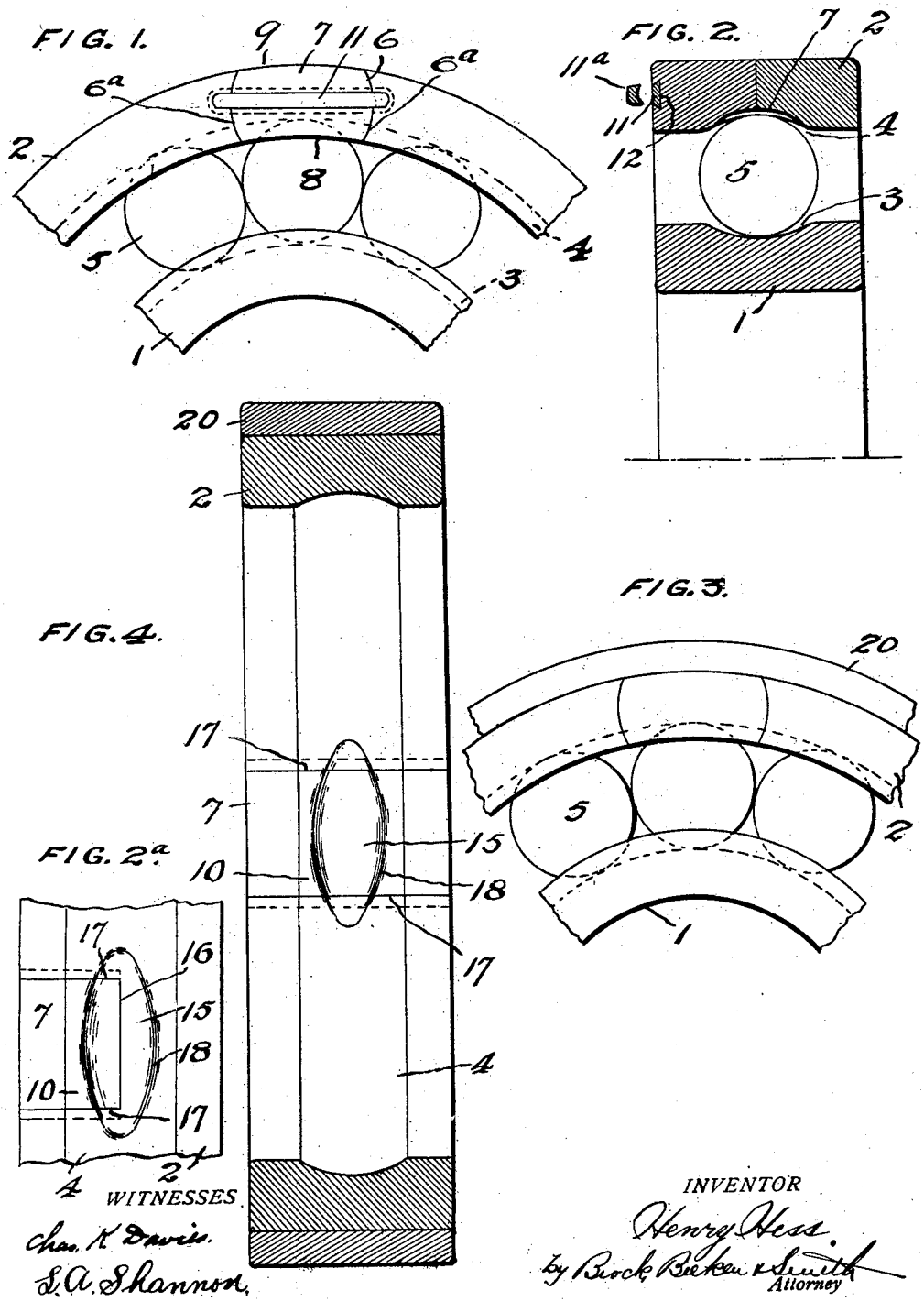

HENRY HESS, OF PHILADELPHIA, PENNSYLVANIA.

BALL-BEARING.

997,913. Specification of Letters Patent. Patented July 11, 1911.

Application filed October 17, 1908. Serial No. 458,183.

*To all whom it may concern:*

Be it known that I, HENRY HESS, a citizen of the United States, and resident of the city of Philadelphia, in the county of Philadelphia and State of Pennsylvania, have invented a certain new and useful Improvement in Ball-Bearings, of which the following is a specification.

My invention relates to ball and other roller bearings.

One of its objects is to provide a bearing of the "full" type having a filling opening closed by a plug.

Another object is to relieve the plug from working pressure by providing a depression in the plug in the path of the balls.

A further object is to prevent the balls coming in contact with the intersections of the plug and the bearing ring by extending the depression in the plug across such intersections.

Incidental to the foregoing objects, I provide a new type of filling opening and plug.

The foregoing and other objects and advantages of my invention will be further explained hereinafter so far as may be necessary.

In the accompanying drawing I show different structures which are representative of my invention. It is to be understood, however, that the invention is capable of embodiment in different forms.

Figure 1 is an end view of a fragment of an annular ball bearing embodying the invention; Fig. 2 is a cross section of Fig. 1; Fig. 2ª is a plan view of a portion of one of the bearing rings of Figs. 1 and 2, showing the plug and depression. Fig. 3 is an end view of a fragment of a bearing employing a modified form of filling plug; and Fig. 4 is a cross section of the outer bearing ring and retaining ring of Fig. 3, other parts of the bearing being removed.

Reference character 1 designates an inner bearing ring and 2, an outer bearing ring provided respectively with races 3, 4, usually of curved cross-section. In the races between the rings is a series of balls 5. To permit insertion of the balls one of the rings (in the construction shown the outer ring) is provided with a cut or opening 6 extending part way, generally half-way, across the ring. The walls 6ª of said opening are conveniently made of cylindrical contour, as shown. After the balls are inserted, the opening is closed by a plug 7 having cylindrical sides fitting the walls 6ª of the opening. The inner and outer faces 8, 9 of the plug are shaped to conform with the general outline of the bearing ring. The portion of the plug extending into the race is finished to conform to the race surface as at 10, Fig. 2ª. Since the side walls of the filling plug are cylindrical, the plug may have a tendency to turn in relation to the ring. This tendency is resisted when the bearing is in working position by contact of the plug with the seat in which the outer ring rests. As an additional precaution and also to prevent turning or endwise displacement of the plug before the bearing is put in working position, a key 11 may be provided, which lies in a groove 12 passing through the outer face of the plug and extending some distance into the bearing ring at each side of the plug. The groove may conveniently be countersunk or flared toward the bottom, as shown and the key may be originally of the shape shown at 11ª, Fig. 2. By inserting the key 11ª in the groove and pressing it home it is expanded to fill the groove and forms a secure permanent lock preventing the plug from turning or moving endwise.

With a bearing constructed as so far described, the working pressure of balls passing over the plug would tend to turn or otherwise move it since the plug is a separate piece. The bearing ring is naturally weaker at the plug than elsewhere. For both these reasons it is desirable to relieve this working pressure at the plug. Moreover, it is desirable to prevent the balls when under working pressure from encountering the intersections of the plug with the race, since such contact under load has been found to cause a crumbling of the race surfaces. To meet all these difficulties I form a depression 15 in the race 4 at the point of entry of plug 7. As shown, the depression completely incloses the intersection 16 of the inner end of the plug with the bearing ring and also extends beyond the lines of intersections 17 of the sides of the plug with the race. The edges 18 of the depression are rounded so that there is no abrupt line of contact for the balls. The depth of the depression is exaggerated in all the figures of the drawing in order to make the construction readily apparent to the eye. The necessary depth of the depression is only equal substantially to the amount of deformation of a ball under pressure. It is apparent that as the balls approach the filling plug 7 they are relieved from pressure by the depression 15 and that the depression also prevents their coming in contact with the lines of intersection of the plug and race when under pressure. As the balls leave the depression they encounter the curved edge of the end of the depression and gradually become compressed and take up their load again without injury to the race or the balls.

Instead of the form of filling opening and plug shown in Figs. 1, 2 and 2ª, the opening may be extended entirely across the bearing ring as shown in Figs. 3 and 4. The plug correspondingly extends entirely across the ring. Since with this form of opening and plug the bearing ring is entirely broken at one point, it is generally desirable to provide an outer locking or retaining ring 20 surrounding the outer bearing ring. Ring 20 serves not only to prevent any spreading of the bearing ring but restrains the plug from turning. The race of the outer ring is continued across the plug as shown in Fig. 4 and a depression substantially similar to the one already described is formed in the race, extending across the plug and overlapping the intersections of the plug with the bearing ring.

I claim:

1. The combination of two bearing rings provided with ball races, balls in the races, one of the bearing rings being provided with a filling opening, and a plug having a depression in the path of the balls to relieve the parts of working pressure as the balls pass the plug.

2. The combination of an inner and an outer bearing ring provided with ball races, a series of balls in the races, one of the rings being provided with a filling opening, and a plug closing the filling opening, the portion of the plug entering the race of said ring being shaped to form a continuation of the race, the race of said ring being provided with a depression including the lines of intersection of the plug with the race.

3. The combination of an inner and an outer bearing ring provided with races, balls in the races, one of the rings being provided with a side filling opening extending through the ring in a radial direction, the walls of the ring forming the opening being curved in a section at right angles to the axis of the bearing and a filling plug closing the opening, the sides of the plug being complementally shaped to fit the walls of the ring.

4. The combination of an inner and an outer bearing ring provided with races, balls in the races, one of the rings being provided with a side filling opening extending through the ring in a radial direction, the walls of the ring forming the opening being curved in a section at right angles to the axis of the bearing and a filling plug closing the opening, the sides of the plug being complementally shaped to fit the walls of the ring, and means for preventing the plug from turning.

5. The combination of an inner and an outer bearing ring provided with races, balls in the races, one of the rings being provided with a filling opening extending through the ring in a radial direction, the walls of the ring forming the opening being of cylindrical contour and a filling plug closing the opening, the sides of the plug being cylindrically shaped to fit the walls of the ring, said bearing ring being provided with a groove extending across the plug, and a key filling the groove in the plug and ring.

6. The combination of an inner and an outer bearing ring provided with races, balls in the races, one of the rings being provided with a filling opening extending through the ring in a radial direction, the walls of the ring forming the opening being of cylindrical contour and a filling plug closing the opening, the sides of the plug being cylindrically shaped to fit the walls of the ring, said bearing ring being provided with a countersunk groove extending across the plug, and a key filling the groove in the plug and ring.

HENRY HESS.

Witnesses:
NETTIE L. HAHN,
MARY M'CALLA.